May 28, 1957  R. E. SEARS  2,793,538
WIPER FOR SCREW THREADS
Filed Dec. 16, 1955  2 Sheets-Sheet 1
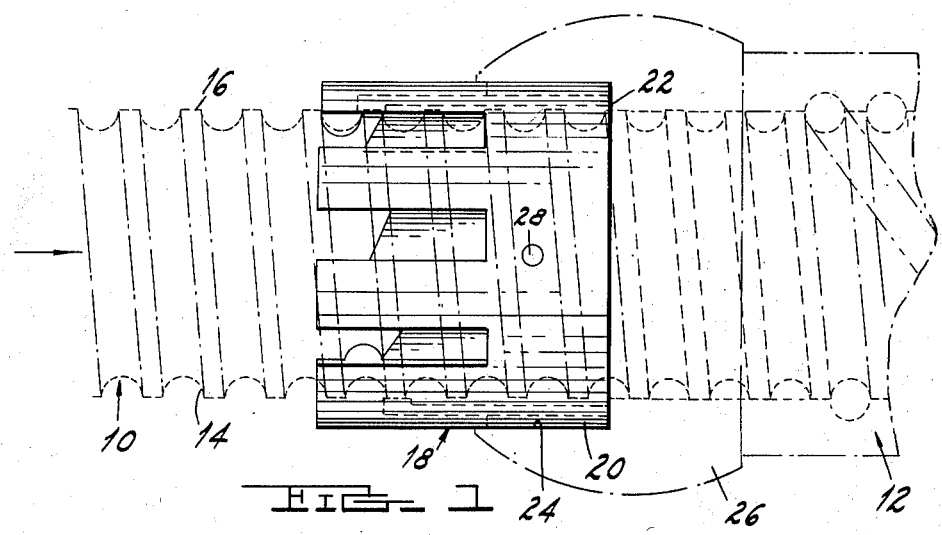
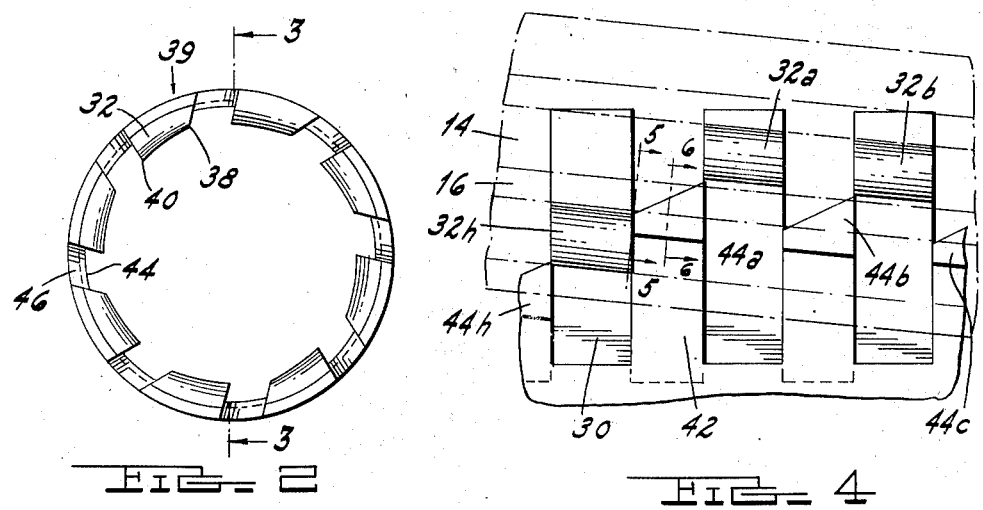
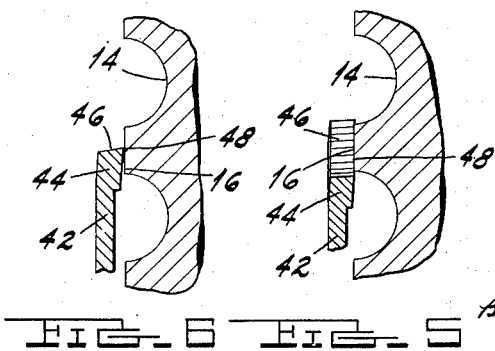
INVENTOR.
RICHARD E. SEARS
BY
Barnes, Kisselle, Laughlin & Raisch
ATTORNEYS

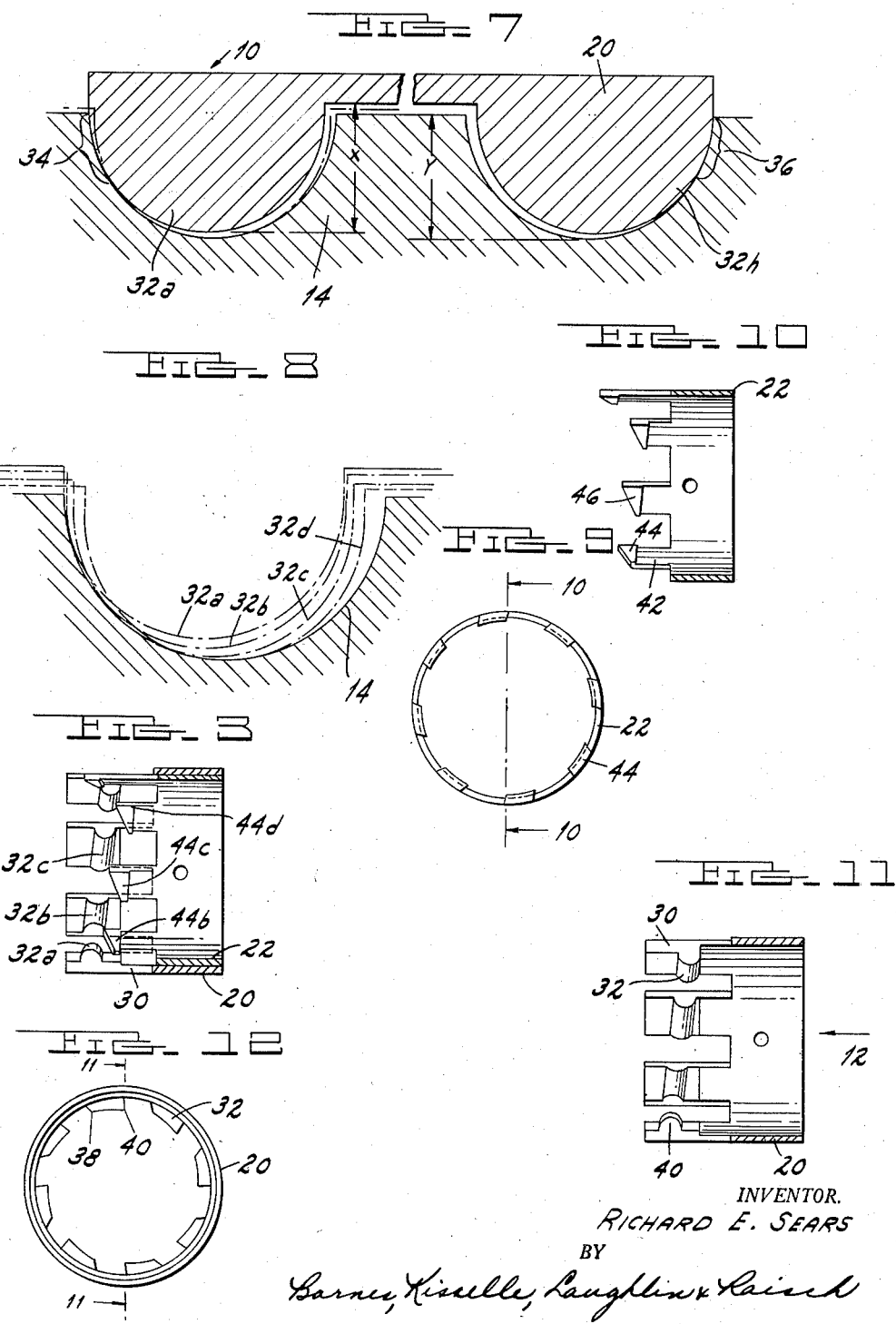

United States Patent Office 2,793,538
Patented May 28, 1957

2,793,538
WIPER FOR SCREW THREADS

Richard E. Sears, Birmingham, Mich., assignor to Beaver Precision Products, Inc., Clawson, Mich., a corporation of Michigan Application December 16, 1955, Serial No. 553,486

20 Claims. (Cl. 74—459)

This invention relates to a wiper for screw threads and more particularly to a device for maintaining the threads of a ball bearing type screw absolutely clean.

In many applications where ball bearing type screws are employed, conditions are such that the exposed portion of the screw is apt to become filled with dirt, grit and the like; and it is obvious that in order to obtain the inherent advantages of such screws, the threads must be maintained absolutely clean so that a minimum of friction is encountered in the operation of the screw.

For example, ball bearing screws are often employed When used under such condtions, it often happens that mud, ice, etc, accumulate on the exposed portion of the screw. This accumulation must be scraped free so as to provide the thread with an absolutely clean surface before that particular portion of the thread comes into contact with the balls in the nut. Otherwise, the friction encountered would be severe and jamming might even result. The presence of dirt in the thread will usually also rapidly increase wear of the balls and the thread. In some substances where the particle of dirt is such that as a ball passes over it, it is subjected to the entire load on the screw, a complete failure by fracture of the ball may result.

It is an object of this invention to provide a device adapted for effectively wiping both the arcuate groove and the land of the thread of a ball bearing type screw absolutely clean as the thread approaches the nut in operation.

In the drawings:

Fig. 1 is a view showing a ball bearing type screw and nut provided with the wiper of this invention.

Fig. 2 is a front end view of the wiper illustrated in Fig. 1.

Fig. 3 is a sectional view taken along the lines 3—3 in Fig. 2.

Fig. 4 is a schematic view of a portion of the wiper and of the thread of the screw developed into a flat plane.

Fig. 5 is a sectional view taken along the lines 5—5 in Fig. 4.

Fig. 6 is a sectional view taken along the lines 6—6 in Fig. 4.

Fig. 7 is a sectional view showing the relative positions of the first and last tooth on the wiper in relation to the thread of the screw.

Fig. 8 is a schematic view illustrating the manner in which successive teeth on the wiper engage the groove of the thread on the screw.

Fig. 9 is a front end view of the member of the wiper unit that is designed to scrape the land portion of the screw thread.

Fig. 10 is a sectional view taken along the lines 10—10 in Fig. 9.

Fig. 11 is a sectional view of the member of the wiper designed to scrape the arcuate screw portion of the thread.

Fig. 12 is a rear end view of the member shown in Fig. 11 as viewed in the direction of the arrow 12 in Fig. 11.

In Fig. 1, a ball bearing type screw is indicated generally at 10; and the nut for use with such screw is generally designated 12. The construction of such screws and nuts is generally well known, and it is suffice to say that the screw is provided with a thread in the form of a helical groove 14 of semi-circular shape in cross section with the adjacent convolutions separated by a cylindrical land 16. Within the nut 12, there is arranged a series of balls, not shown, which engage in the grooves 14 to produce relative rotation between screw 10 and nut 12 with a minimum of friction when one of these members is moved axially relative to the other. The wiper of this invention is generally designated 18 and comprises an outer sleeve 20 and an inner sleeve 22 telescoped within the outer sleeve 20. The sleeve 20 is seated in a counterbore 24 formed in an enlargement 26 at the front or leading end of nut 12. A pin 28 forms a driving connection between sleeves 20, 22 and the enlargement 26 of nut 12.

Referring now to Figs. 11 and 12, sleeve 20, it will be observed, is fashioned with a series of circumferentially spaced axially extending fingers 30 at the outer or front end thereof. The fingers 30 are each provided on the inner surface thereof with an arcuate button or tooth 32. In the arrangement illustrated, either of such teeth 32 are provided; and they are disposed in a manner such as to form one convolution of a spiral.

Referring more particularly to Figs. 7 and 8, it will be seen that the teeth 32 are of semi-circular shape in cross section. However, the diameter of these tooth portions is slightly less than the diameter of the semi-circular groove 14. The extent to which the teeth 32 project radially inwardly from the sleeve 20 is, however, greater than the depth of the semi-circular groove 14; or, stated differently, the dimension $x$ in Fig. 7 is greater than the dimension $y$. Fig. 7 shows a section through the axially innermost and axially outermost teeth in the single convolution. It will also be seen from the showing in Fig. 7 that in the arrangement shown, the lead of the thread on the screw 10 is greater than the lead of the helix formed by the teeth 32. The cross sectional diameters of the teeth 32 and the groove 14 and the lead of helix formed by teeth 32 and the lead of the groove 14 are related such that the axially outermost tooth 32a is in generally curvilinear contact with one convolution of the groove 14 at the area generally designated 34 and the axially innermost tooth 32h is in generally curvilinear contact with the same convolution of the thread at the area generally designated 36. The teeth intermediate the teeth 32a and 32h also have a portion in generally curvilinear contact with the groove 14, but the areas of contact are staggered progressively around the arc of groove 14 as shown in Fig. 8 so that these areas overlap one another and the eight teeth 32 as a group contact the whole arc of the groove 14 through one convolution thereof. If desired, the lead of the helix formed by teeth 32 may be slightly less than that of the thread 14, in which case the face portions of groove 14 engaged by teeth 32a and 32h would be the opposite from that shown in Fig. 7. Fingers 30 are somewhat resilient, and the diameter of the circle formed by the radially innermost surfaces of the teeth 32 is slightly smaller than the root diameter of the thread groove 14. Thus, the teeth 32 are in pressure contact with the surface of groove 14 and are therefore adapted to effectively wipe the groove 14 free from all dirt or grit on the surface thereof.

The teeth 32 are ground with a back-off clearance 38 so that a high unit pressure is insured between the leading edge 40 of each tooth and the groove 14. This back-off clearance 38 is conveniently provided by twisting each finger slightly in a grinding fixture by pressure applied generally radially inwardly to the trailing edge of each tooth as at 39 and then permitting the teeth to spring back to their normal position shown in Fig. 12 after grinding.

Referring now to Figs. 3, 9 and 10, the inner sleeve 22 is also fashioned with a plurality of axially extending fingers 42; and these fingers, in the assembled condition of the wiper, are arranged to be disposed between and engage the fingers 30 of the outer sleeve 20. Each of the fingers 42 is provided at the free end thereof with a pad 44. The pads 44, like teeth 32, are also arranged in the form of a helix so that one pad 44 will be disposed slightly axially inwardly of the adjacent tooth 32 on sleeve 20. Pads 44 are fashioned with beveled end faces 46, and these faces are designed to extend angularly across the land 16. In order to obtain a relatively high unit pressure between the pads 44 and the surface of land 16, each of the fingers 42 is bent slightly inwardly adjacent its outer end as shown in Fig. 6 so that there is substantially only line contact at the edge 48 between the land 16 and each pad 44. In the untensioned condition of fingers 42, the circle defined by the scraping edges 48 is slightly less than the diameter of the cylindrical land 16.

In order to better illustrate the principle of operation of the wiper of the present invention, I have illustrated in Fig. 4 a portion of the wiper laid out in the flat with reference to the screw thread. The axially outermost tooth is indicated at 32a, the next tooth, 32b and the axially innermost tooth, 32h. The axially outermost pad is designated 44a and the axially innermost pad 44h. The pads next adjacent the first pad 44a are designated 44b and 44c. As explained above, the teeth from 32a and 32h form a helix angle such that in one convolution, the successive teeth scrape successive portions of the arcuate groove so that cumulatively, the entire extent of the semicircular arc forming groove 14 is scraped or wiped by the teeth 32. It will be observed that the pads 44 extend beyond the opposite edges of the lands 16 and that each pad is disposed axially inwardly from its adjacent tooth 32. Thus, the entire width of the land 16 is effectively scraped; and the foreign material such as dirt, ice, etc. that is scraped from one convolution of the thread is prevented from entering the next interadjacent convolution by the adjacent pad 44. The bevel edge 46 enables the foreign matter accumulating to ride up over the fingers 42 and the land and the groove of the thread is thereby effectively cleaned prior to its coming in contact with the balls within the nut 12. Tests with wipers of this construction have shown that the arrangement of teeth 32, as illustrated, is so effective that even pencil marks are removed from the thread groove by this wiper without producing any chattering or jamming of the teeth in the thread groove.

Throughout the description and claims herein, the thread groove is described as having a semi-circular shape. The term "semi-circular" is used in a broad sense to cover such other forms of threads as are used on ball bearing screws, such as ogival and the like; and it will be appreciated that the shape of teeth 32 corresponds to the shape of the groove to be wiped.

I claim:

1. A wiper for the thread of a ball bearing screw comprising an annular member adapted to surround the screw, said annular member having a plurality of radially inwardly extending teeth thereon, said teeth being arranged circumferentially as a helix and adapted to project into the thread groove of the screw, said teeth each having a scraper edge portion adapted to bear against a portion of the arcuate surface of the thread groove, said scraping edge portions being progressively staggered such that as a group, they define a curve which generally corresponds to the cross sectional shape of the thread groove.

2. A thread wiper as called for in claim 1 wherein said annular member is fashioned with a plurality of circumferentially spaced, axially extending resilient fingers, said teeth being arranged on said fingers.

3. A thread wiper as called for in claim 1 wherein said teeth are of generally semi-circular shape in axial cross section.

4. A thread wiper as called for in claim 1 including a pad disposed between each pair of adjacent teeth, said pads each having a free edge angularly related to the helix formed by said teeth such that said edges are adapted to extend angularly across the portion of the land of the thread adjacent each of said teeth.

5. In combination, a ball bearing screw having a helical thread which is defined in axial cross section by a generally semi-circular groove with each convolution of the groove being spaced from the next adjacent convolution by a spiral land, a wiper for said thread comprising a sleeve surrounding a portion of said thread, said sleeve having a plurality of radially inwardly projecting teeth spaced circumferentially around the inner side thereof, said teeth projecting into said groove, each of said teeth having a leading edge bearing against only a portion of the surface of said groove, said leading edges being staggered circumferentially around the arc of said semi-circular groove such that cumulatively, they cooperate to wipe substantially the entire cross sectional surface of said semi-circular groove.

6. The combination called for in claim 5 wherein said teeth are of generally semi-circular shape in cross section and have a diameter slightly less than the diameter of the generally semi-circular arc defined by said groove.

7. The combination called for in claim 5 wherein the lead of the helix formed by said teeth is slightly different from the lead of said thread.

8. The combination called for in claim 5 wherein the lead of the helix formed by said teeth is slightly greater than the lead of said thread.

9. The combination called for in claim 5 wherein said teeth form at least one convolution of a helix, the two teeth forming the beginning and end of said one convolution engaging the surface of said groove adjacent opposite extremities of the semi-circular arc forming said groove and the teeth intermediate said previously mentioned teeth progressively engage successive overlapping portions of said semi-circular arc.

10. The combination called for in claim 5 wherein the radially innermost surfaces of said teeth taper outwardly from the leading edge to the trailing edge of each tooth in a circumferential direction whereby to provide clearance between said groove and the teeth rearwardly of said leading edges.

11. The combination called for in claim 10 wherein said sleeve comprises a body portion having axially extending resilient fingers, said teeth being disposed adjacent the free ends of said fingers and in the untensioned condition of said fingers, the circle formed by the radially innermost surfaces of said teeth has a diameter slightly smaller than the root diameter of said thread.

12. In combination, a ball bearing screw having a helical thread which is defined in axial cross section by a generally semi-circular groove with each convolution of the groove being spaced from the next adjacent convolution by a generally cylindrical spiral land, a wiper for said thread comprising a sleeve unit extending circumferentially around a portion of said thread, said sleeve unit having a plurality of radially inwardly projecting teeth spaced circumferentially around the inner side thereof, said teeth projecting into said groove, each of said teeth having a leading edge bearing against only a portion of the surface of said groove, said leading edges being staggered circumferentially around the arc of said semi-circular groove such that cumulatively, they cooperate to wipe substantially the entire cross sectional surface of said semi-circular groove, said sleeve unit also having a plurality of pads thereon arranged circumferentially as a spiral and having free edge portions, said free edge portions engaging and extending across the cylindrical land of the thread.

13. The combination called for in claim 12 wherein said free edge portions are in pressure contact with the land and extend across the land in a generally diagonal direction.

14. The combination called for in claim 13 wherein said teeth are regularly spaced apart circumferentially of said sleeve unit and said pads are disposed one between successive teeth.

15. The combination called for in claim 14 wherein said teeth are of generally semi-circular shape in axial section and the helix formed by said teeth has a lead slightly different from the lead of said thread.

16. The combination called for in claim 15 wherein said sleeve unit is fashioned with a plurality of axially extending resilient fingers, said teeth and pads being disposed adjacent the free ends of said fingers in the untensioned condition of said fingers, the radially innermost surfaces of said teeth and pads defining circles having a diameter less than the root diameter of the thread and the diameter of the land portion, respectively.

17. In combination, a ball bearing screw and a nut thereon, said ball bearing screw having a helical thread defined by a groove having a generally semi-circular shape in axial cross section with a generally cylindrical spiral land disposed between adjacent convolutions of said groove, a wiper for maintaining said groove and land free from dirt and the like comprising a sleeve unit mounted at one end of said nut and surrounding said screw, said sleeve unit being provided on the inner side thereof with a plurality of teeth projecting radially into said groove, said teeth having leading edge portions, the leading edge portion of each tooth engaging only a portion of the surface of the groove defined by said semi-circular arc, the leading edge portions of successive teeth engaging successively adjacent portions of said semi-circular arc such that cumulatively, they wipe the entire cross sectional surface of the groove.

18. The combination called for in claim 17 wherein said sleeve unit includes a plurality of axially extending spring fingers, said spring fingers being provided adjacent their free ends with edge portions engaging and extending diagonally across the land portion of the thread, said last mentioned edge portions being disposed adjacent and axially inwardly of each of said teeth.

19. The combination called for in claim 18 wherein said sleeve unit comprises two sleeves telescoped one within the other, said teeth being disposed on the outer sleeve and said fingers being disposed on the inner sleeve.

20. The combination called for in claim 19 wherein said outer sleeve is provided with a plurality of circumferentially spaced axially extending spring fingers, said teeth being disposed adjacent the free ends of said spring fingers, the spring fingers on the inner sleeve being disposed between the fingers on the outer sleeve and engaging the fingers on the outer sleeve.

References Cited in the file of this patent

UNITED STATES PATENTS

| | | |
|---|---|---|
| 1,785,406 | Cornett | Dec. 16, 1930 |
| 2,757,548 | Smith | Aug. 7, 1956 |